US012768731B2

(12) United States Patent
Shen

(10) Patent No.: US 12,768,731 B2
(45) Date of Patent: Oct. 20, 2026

(54) APPARATUS AND SYSTEM FOR DETERMINING A FORCE APPLIED ON A DEFORMABLE MATERIAL

(71) Applicant: The Hong Kong University of Science and Technology, Hong Kong (CN)

(72) Inventor: Yajing Shen, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 275 days.

(21) Appl. No.: 18/739,385

(22) Filed: Jun. 11, 2024

(65) Prior Publication Data

US 2024/0418585 A1 Dec. 19, 2024

Related U.S. Application Data

(60) Provisional application No. 63/507,737, filed on Jun. 13, 2023.

(51) Int. Cl.
*G01L 1/24* (2006.01)
*G01B 11/16* (2006.01)

(52) U.S. Cl.
CPC ................ *G01L 1/24* (2013.01); *G01B 11/16* (2013.01)

(58) Field of Classification Search
CPC .................................. G01L 1/24; G01B 11/16
USPC ............................................................ 73/760
See application file for complete search history.

(56) References Cited

U.S. PATENT DOCUMENTS

| | | | | |
|---|---|---|---|---|
| 11,345,040 | B2 | 5/2022 | Oleynik | |
| 11,797,102 | B2 | 10/2023 | Jorasch et al. | |
| 2013/0104672 | A1* | 5/2013 | Kim | B25J 13/085 73/862.624 |

FOREIGN PATENT DOCUMENTS

| | | | |
|---|---|---|---|
| CN | 106582009 | A | 4/2017 |
| CN | 109663348 | A | 4/2019 |
| CN | 111367416 | A | 7/2020 |
| CN | 115435818 | A | 12/2022 |
| JP | 2020041967 | A | 3/2020 |

OTHER PUBLICATIONS

Wei Li et al., Ferroelectret nanogenerators for the development of bioengineering systems, Cell Reports Physical Science 4, 101388, May 17, 2023, pp. 1-35.
Lac Van Duong et al., Large-Scale Vision-Based Tactile Sensing for Robot Links: Design, Modeling, and Evaluation, IEEE Transactions On Robotics, vol. 37, No. 2, Apr. 2021, pp. 390-403.
Hinchet R. et al. Dextres: Wearable haptic feedback for grasping in vr via a thin form-factor electrostatic brake[C]// Proceedings of the 31st Annual ACM Symposium on User Interface Software and Technology. 2018: 901-912.
Taylor B. T. et al., Graspables: grasp-recognition as a user interface[C]// Proceedings of the SIGCHI Conference on Human Factors in Computing Systems. 2009: pp. 917-926.

(Continued)

*Primary Examiner* — Nathaniel T Woodward
(74) *Attorney, Agent, or Firm* — S&F/WEHRW

(57) ABSTRACT

An apparatus comprises a body made of a deformable material, and a plurality of protrusions movably attached to an inner surface of the body, each of the plurality of protrusions extending in a direction from the inner surface towards a center of the body, and configured to be moveable in the direction in response to a deformation of the body.

18 Claims, 12 Drawing Sheets

(56) References Cited

OTHER PUBLICATIONS

Negulescu M. et al., Grip change as an information side channel for mobile touch interaction[C]//Proceedings of the 33rd Annual ACM Conference on Human Factors in Computing Systems. 2015: pp. 1519-1522.
Valve Corporation. 2018. Steam Community Guide Knuckles EV3 What's New.
Potter L. E. et al., The leap motion controller: a view on sign language[C]//Proceedings of the 25th Australian computer-human interaction conference: augmentation, application, innovation, collaboration. 2013: pp. 175-178.
Amir M. H. et al., Duke: enhancing virtual reality based fps game with full-body interactions[C]//Proceedings of the 13th International Conference on Advances in Computer Entertainment Technology. 2016: pp. 1-6.
Ka W. C. et al., Onmyouji: Gesture-based virtual reality game[J]. International Journal of Engineering & Technology, 2018, 7(2.14): pp. 110-113.
Shih B. et al., Electronic skins and machine learning for intelligent soft robots[J]. Science Robotics, 2020, 5(41):eaaz9239, pp. 1-11.
Kim Y. et al., A bioinspired flexible organic artificial afferent nerve[J]. Science, 2018, 360(6392): pp. 998-1003.
Dahiya R. S. et al., Tactile sensing-from humans to humanoids[J]. IEEE transactions on robotics, 2009, 26(1): pp. 1-20.

* cited by examiner

800

900

1000

1100

APPARATUS AND SYSTEM FOR DETERMINING A FORCE APPLIED ON A DEFORMABLE MATERIAL

CROSS-REFERENCE TO RELATED APPLICATIONS

This application claims priority from the U.S. provisional patent application Ser. No. 63/507,737, filed Jun. 13, 2023, entitled "Artificial Skin-based Phygital System for the Cohesion of Human, Robot, and Virtual World", hereby incorporated herein by reference as to its entirety.

FIELD

The present disclosure relates generally to an apparatus and system for determining a force applied on a deformable material.

BACKGROUND

The hand is the primary organ for human touch and tool manipulation, as it is the most direct extension of our consciousness. Grasping is also one of the most common human behaviors that we naturally exhibit when we use hand tools and manipulate objects in the real world. Nowadays, we mostly communicate with the virtual world through joysticks, mice, keyboards, trackpads and so on. As information technology develops, the industry has launched various VR products that integrate hand operation functions. These products typically collect hand manipulation information by using, for example, one or more gamepad controller(s).

However, with the increasing demand for massive and accurate data acquisition, it is believed that the gamepad controller is no longer an ideal input device for VR. For example, it is not possible to utilize a gamepad controller to determine a force and a distribution of the force applied on the controller e.g., via a hand grip. Even for specific devices in the market that attempt to do so by capturing visual data within a device to which a force is applied, it is not only unable to accurately determine a force and a distribution of the force applied on the device, more than one cameras are also typically required for capturing such data.

New methods, apparatus, systems that assist in advancing technological needs and industrial applications in this area are desirable.

SUMMARY

An apparatus comprises a body made of a deformable material, and a plurality of protrusions movably attached to an inner surface of the body, each of the plurality of protrusions extending in a direction from the inner surface towards a center of the body, and configured to be moveable in the direction in response to a deformation of the body.

Other embodiments will be described herein.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to illustrate various embodiments and to explain various principles and advantages in accordance with a present embodiment, by way of non-limiting example only.

Embodiments of the disclosure will be better understood and readily apparent to one of ordinary skill in the art from the following written description, by way of example only, and in conjunction with the drawings, in which.

DETAILED DESCRIPTION

Figure 1:
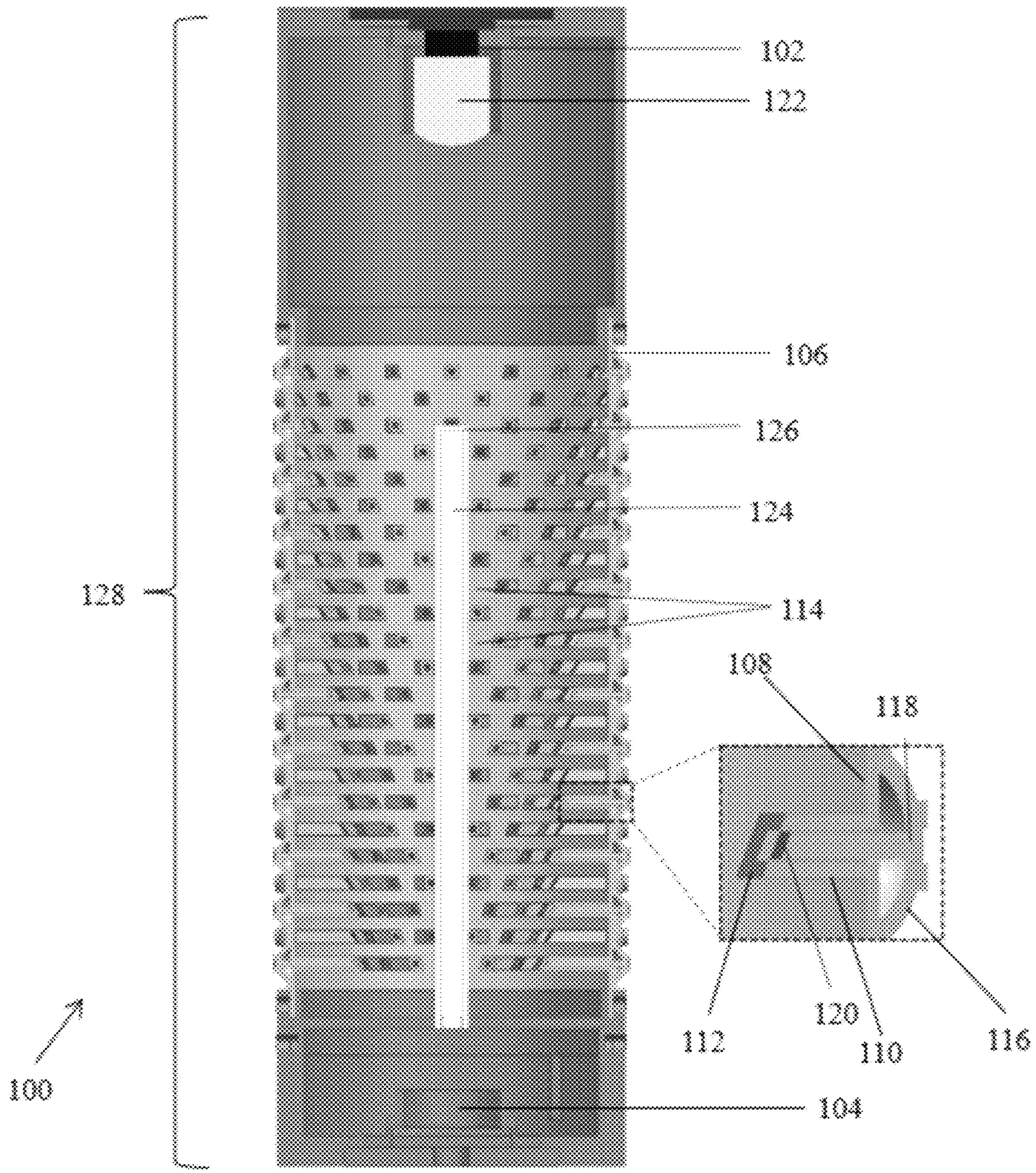
FIG. 1 shows an exemplary illustration of an apparatus for determining a force applied on a deformable material according to certain embodiments of the present disclosure.

Embodiments of the present disclosure will be described, by way of example only, with reference to the drawings. Like reference numbers and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "detecting", "estimating", "comparing", "receiving", "calculating", "determining", "updating", "generating", "initializing", "outputting", "receiving", "retrieving", "identifying", "dispersing", "authenticating" or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a computer effectively results in an apparatus that implements the steps of the preferred method.

Exemplary Embodiments

Various embodiments of the present disclosure relate to an apparatus and system for determining a force applied on a deformable material.

DEFINITION OF TERMS

In the present disclosure, an apparatus is disclosed having a body with a three-dimensional shape consisting of two bases, joined by a surface around the body that, for example, joins the edges around one base to the edges around the other base. The shape of the two bases may be circular, such that the surface is a curved surface and the body may be a cylindrical body or a body with other proper shape. In an implementation, the shape of the two bases may be square, hexagonal, octagonal and other similar shapes, and the two bases may have curved corners. Likewise, although a cylindrical body is primarily referred to in the present disclosure, it will be appreciated that the body may also be squarish, hexagonal, octagonal or other similar shape with curved corners, and the surface may be construed accordingly. The center of the bases overlaps each other to form an axis or straight line through a center of the body. The curved surface may be straight along the length of the cylindrical body from one base to the other base. In an implementation, the curved surface may be ergonomically shaped, for example, to conform to a shape of a hand holding the cylindrical body, or other similar shape. In the present disclosure, an inner surface of a cylinder body refers to the curved surface disposed at an interior of the cylindrical body and facing a center of the cylindrical body. Likewise, an outer surface of the cylindrical body refers to the curved surface disposed at the exterior of the cylindrical body. In the present disclosure, the cylindrical body has a first end and a second end (e.g., each of the two bases as mentioned above).

A deformable material refers to a material that can be changed in shape as a result of, for example, a force acting on it. The material may be elastic such that it reverts to its original shape after a force acting on it is removed. The material may be an artificial skin, rubber, silicon, or other similar material. In an implementation, the cylindrical body of the present disclosure is made of the deformable material. In another implementation, a part of the cylindrical body (e.g., an outer surface and/or an inner surface) is made of the deformable material.

A protrusion refers to an object that bulges out or projects from its surroundings. In the present disclosure, a plurality of protrusions are disposed on the inner surface of the cylindrical body, each protrusion extending in a direction from the inner surface toward the center of the cylindrical body. The plurality of protrusions may be movably attached to the inner surface and configured to be moveable in the direction in response to a deformation of the cylindrical body e.g., when a force is applied on the outer surface of the cylindrical body. Each protrusion may also have a color at an end (e.g., the end of the protrusion that moves towards or away from the center of the cylindrical body as a result of a force applied on the cylindrical body) that is different from a colour of the inner surface which advantageously enables improved accuracy in monitoring of a displacement of the plurality of protrusions. The color may also be different among one another of the plurality of protrusions. The protrusion may be straight and made of the deformable material. In an implementation, the protrusion may be made of a different material from the cylindrical body. In an implementation, a length of each of the plurality of protrusions is proportional to a distance of each of the plurality of protrusions from the first end of the cylindrical body, which advantageously enables a single visual sensor (e.g., disposed at the first end) to monitor a displacement of the plurality of protrusions.

A dome refers to a generally hemispherical structure which may comprise a base that is circular, square, triangular, other similar shape. In the present disclosure, the cylindrical body may comprise a plurality of holes disposed at the outer surface of the cylindrical body, each of the plurality of holes extending through each of the plurality of protrusions. Further, a plurality of domes may be disposed on the outer surface of the cylindrical body in which each of the plurality of domes covers each of the plurality of holes. The plurality of domes may be made of a material that can be changed in shape as a result of, for example, a force acting on it, and the material may be elastic such that it reverts to its original shape after a force acting on it is removed. Thus, the dome may be made of the deformable material, or a different material but with the above-described properties.

In the present disclosure, a marker refers to a thin, hair-like structure (e.g., thinner than the protrusion such that it can pass through the hole) that is attached at one end to a dome and extends from the dome to a hole covered by the dome. The hole extends through a protrusion, and the marker is configured to be movable along the hole in response to a deformation of the dome (as a result of, for example, a force acting on it). Accordingly, a plurality of holes (one hole through each protrusion) and a plurality of markers are present in the cylindrical body. Each marker may also have a color at another end (e.g., the end of the marker that moves in or out of the hole as a result of a force applied on the dome) that is different from a color of both the inner surface and a color of the corresponding protrusion, which advantageously enables improved accuracy in monitoring of a displacement of the plurality of markers. The color may also be different among one another of the plurality of markers. Each marker may be straight, and made of the deformable material or of a different material from the dome. In an implementation, a length of each of the plurality of markers is proportional to a distance of each of the plurality of protrusions from the first end of the cylindrical body, which advantageously enables a single visual sensor (e.g., disposed at the first end) to monitor a displacement of the plurality of markers.

A visual sensor (e.g., such as a thermal camera, infrared camera, red, green and blue (RGB) camera, high definition (HD) camera and other similar visual sensors) may be disposed at an end (e.g., the first end) of the cylindrical body, configured for monitoring any displacement of the plurality of protrusions and/or markers. Sensor data obtained from the visual sensor (e.g., images, videos, and other similar data) may be used by a system to determine a length of the displacement of each of the plurality of protrusions captured by the visual sensor, and determine a force applied on the cylindrical body based on a comparison of the length of the displacement with historical data. The historical data may be training data obtained via a controlled setup in which a force is applied at one or more locations of the cylindrical and the results of the displacement are compared with ground truth data e.g., measurements of the actual force applied for each displacement.

A light source may be utilized to provide illumination within the cylindrical body to facilitate monitoring of any displacement of the plurality of protrusions and/or markers by the visual sensor. The light source may be pillar-shaped, and extend along the center of the cylindrical body from the second end (e.g., opposite the first end at which the visual sensor is disposed) of the cylindrical body. The light source may comprise a polarized film covering a surface of the pillar-shaped light source to filter out any unwanted reflected light to advantageously improve accuracy in monitoring of a displacement of the plurality of markers and/or protrusions by the visual sensor.

FIG. 1 shows an exemplary illustration of an apparatus 100 for determining a force applied on a deformable material according to various embodiments of the present disclosure. The apparatus 100 may comprise a cylindrical body 128. In the present example, a curved surface 106 of the cylindrical body 128 is straight along a length from a first end 102 to a second end 104 of the cylindrical body 128. In an implementation, the curved surface may be ergonomically shaped, for example, to conform to a shape of a hand holding the cylindrical body 128, or other similar shape. The curved surface 106 of the cylindrical body 128 may be made of a deformable material. The deformable material may be an artificial skin, rubber, silicon, or other similar material. In an implementation, the entire cylindrical body 128 may be made of the deformable material. In another implementation, a part of the cylindrical body 128 (e.g., an outer surface and/or an inner surface of the curved surface 106 of the cylindrical body 128) may be made of the deformable material.

The cylindrical body 128 may comprise a plurality of protrusions 110 disposed on an inner surface 108 of the cylindrical body 128, each protrusion 110 extending in a direction from the inner surface toward the center of the cylindrical body 128. The plurality of protrusions 110 may be movably attached to the inner surface and configured to be moveable in the direction in response to a deformation of the cylindrical body 128 e.g., when a force is applied on the outer surface of the cylindrical body 128. Each protrusion 110 may also have a color at an end 112 (e.g., the end of the protrusion 110 that moves towards or away from the center of the cylindrical body as a result of a force applied on the cylindrical body) that is different from a color of the inner surface 108 which advantageously enables improved accuracy in monitoring of a displacement of the plurality of protrusions 110. The color may also be different among one another of the plurality of protrusions 110. The protrusion 110 may be straight and made of the deformable material. In an implementation, the protrusion 110 may be made of a different material from the cylindrical body 128.

Further, there may be a plurality of holes 114 disposed at the curved surface 128, each of the plurality of holes 114 extending through each of the plurality of protrusions 110. Further, a plurality of domes 116 may be disposed at the curved surface 128 (e.g., on the outer surface of the cylindrical body 128) in which each of the plurality of domes 116 covers each of the plurality of holes 114. The plurality of domes 116 may be made of a material that can be changed in shape as a result of, for example, a force acting on it, and the material may be clastic such that it reverts to its original shape after a force acting on it is removed. Thus, the dome 116 may be made of the deformable material, or a different material but with the above-described properties.

The apparatus 100 may further comprise a plurality of markers 118 that are thin, hair-like structures (e.g., thinner than the protrusion 110 such that it can pass through the hole 114). Each marker 118 may be attached at one end to a dome 116 and extends from the dome 116 to a hole 114 covered by the dome 116. Each hole 114 may extend through each of the plurality of protrusions 110, and each marker 118 may be configured to be movable along each hole 114 in response to a deformation of a corresponding dome 116 (as a result of, for example, a force acting on it). Each marker 118 may also have a color at another end 120 (e.g., the end of the marker 118 that moves in or out of the hole 114 as a result of a force applied on the corresponding dome 116) that is different from a color of both the inner surface 108 and a color of the corresponding protrusion 110, which advantageously enables improved accuracy in monitoring of a displacement of the plurality of markers 118. The color may also be different among one another of the plurality of markers 118. For example, the end 120 of each marker 118 may be red in color, the end 112 of each protrusion 110 may be green in color, and the inner surface 108 may be white in color. It will be appreciated that other combinations and variations of the colors are also possible. Further, each marker 118 may be straight, and may be made of the deformable material or of a different material from the dome 116.

A visual sensor 122, such as a camera, may be disposed at the first end 102 of the cylindrical body 128, configured for monitoring any displacement of the plurality of protrusions 110 and/or markers 118. Sensor data obtained from the visual sensor 122 (e.g., images, videos, and other similar data) may be used by a system to determine a length of the displacement of each of the plurality of protrusions 110 captured by the visual sensor 122, and determine a force applied on the cylindrical body 128 based on a comparison of the length of the displacement with historical data. In an implementation, a length of each of the plurality of protrusions 110 may be proportional to a distance of each of the plurality of protrusions 110 from the first end 102 of the cylindrical body 128, which advantageously enables a single visual sensor 122 disposed at the first end 102 to monitor a displacement of the plurality of protrusions 110. In an implementation, a length of each of the plurality of markers 118 is proportional to a distance of each of the plurality of markers 118 from the first end of the cylindrical body, which advantageously enables a single visual sensor 122 disposed at the first end 102 to monitor a displacement of the plurality of markers 118. This design can effectively avoid mutual occlusion of markers 118 and protrusions 110 caused by deformation of the cylindrical body 128 and/or domes 116, and thus improve accuracy of optical tracking by the visual sensor 122. In an implementation, each colored end of the marker 118 and protrusion 110 may be angled and faced towards the visual sensor 122 to facilitate capturing of a displacement of the marker 118 and protrusion 110 by the visual sensor 122.

A light source 124 may be utilized to provide illumination within the cylindrical body 128 to facilitate monitoring of any displacement of the plurality of protrusions 110 and/or markers 118 by the visual sensor. The light source 124 may be pillar-shaped to provide uniform light on the surfaces of the plurality of protrusions 110 and markers 118, and extend along the center of the cylindrical body 128 from the second end 104 (e.g., opposite the first end 102 at which the visual sensor 122 is disposed) of the cylindrical body 128. The light source 124 may comprise a polarized film 126 covering a surface of the pillar-shaped light source 124 to filter out any unwanted reflected light to advantageously improve accuracy in monitoring of a displacement of the plurality of markers 110 and/or protrusions 118 by the visual sensor 122.

Figure 2:
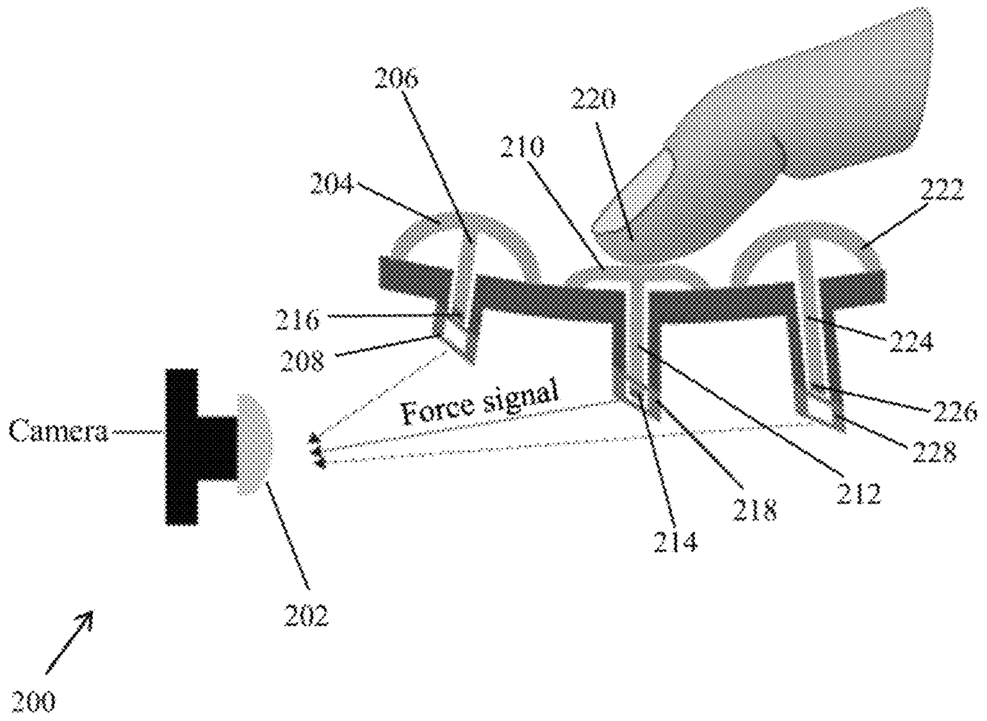
FIG. 2 shows an exemplary illustration of how a displacement of a marker may be detected according to certain embodiments of the present disclosure.

FIG. 2 shows an exemplary illustration 200 of how a displacement of a marker may be detected according to various embodiments of the present disclosure. A visual sensor 202 may be disposed at one end (e.g., at the first end 102 of the cylindrical body 128) to monitor a displacement of three markers 206, 212 and 224, aided by illumination provided by a light source (e.g., light source 124 in the cylindrical body 128). For simplicity, only three sets of markers are illustrated here. As no force is applied on domes 204 and 222, the markers 206 and 224 do not move, and accordingly respective ends 216 and 226 of the markers 206 and 224 also do not move towards or away from respective ends of corresponding protrusions 208 and 228. When a force 220 is applied on dome 210, the marker 212 moves (e.g., with reference to FIG. 1, along a corresponding hole 114 within a corresponding protrusion 110, and further towards the center of the cylindrical body 128) such that an end 214 of the marker 212 approaches an end of corresponding protrusion 218, and may subsequently extend out through the end of the corresponding protrusion 218. A displacement of the end 214 of the marker 212 as a result of the movement of extending out through the end of the corresponding protrusion 218 is thus captured by the visual sensor 202.

In an implementation, the marker end 214 may not need to extend out of the corresponding protrusion 218 in order for the visual sensor 202 to detect its movement. For example, as shown in illustration 200, each colored end of the markers 206, 212 and 224 as well as each colored end of the protrusions 208, 218 and 228 may be angled and faced towards the visual sensor 202 to facilitate capturing of any displacement of the markers and protrusions by the visual sensor 122. Thus, due to the angled nature of the ends of each marker and protrusion, the colored end 214 of the marker 212 which is extended up to the end of the protrusion 218 but still within the protrusion 218 (e.g., not protruding out of the end of the protrusion 218) is visible to the visual sensor 202, and thus movement of the end protrusion 218 is detected by the visual sensor 202. The protrusions 208, 218 and 228 may all move (e.g., each being displaced with varying lengths) as a result of the force 220 applied on the dome 210, but it is possible to determine where on the apparatus is the force applied due to detection of the end 214 (e.g., determining that the force 220 is applied on the dome 210 due to displacement of the end 214). Thus, sensitivity of the apparatus in detecting and determining a force applied on the cylindrical body is advantageously improved. It will be appreciated that the protrusions 208, 218 and 228 may move (e.g., with reference to FIG. 1, further towards the center of the cylindrical body 128) as a result of a force applied on a location on the curved surface around and close to the respective domes 204, 210 and 222 but not applied directly on the domes 204, 210 and 222, such that the respective markers 206, 212 and 224 do not move within the respective protrusions 208, 218 and 228, which enables a more accurate force distribution map to be generated.

Figure 3:
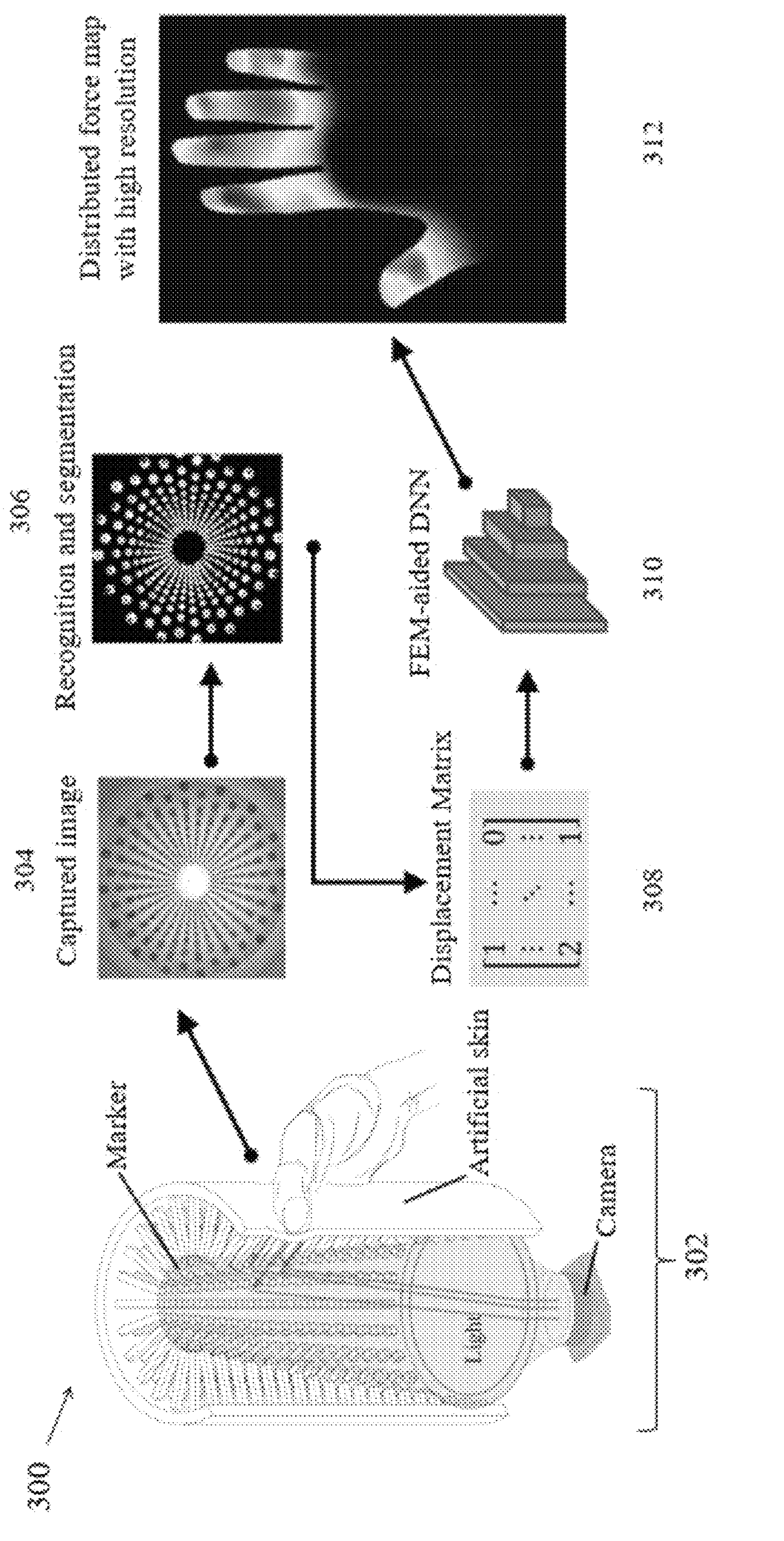
FIG. 3 shows an exemplary process of how a force and a distribution of a force may be determined according to certain embodiments of the present disclosure.

FIG. 3 shows an exemplary process 300 of how a force and a distribution of a force may be determined according to various embodiments of the present disclosure. At a stage 302, a force is applied on the apparatus 100, for example via a hand grip around the cylindrical body 128 as shown in this illustration, or via other similar application of force. Displacement of one or more protrusions and/or one or more markers as a result of the applied force is captured by a visual sensor such as a camera (e.g., disposed at the first end 102 of the apparatus 100) as shown in the present illustration. At a stage 304, one or more captured images of the plurality of markers and protrusions from the camera (e.g., indicating a displacement as a result of the force applied at stage 302) may be utilized as input for an image segmentation algorithm. Under illumination of a light source (e.g., light source 124), the markers and protrusions of different colors (e.g., blue, green, red, or other similar colors) are configured to have an obvious color contrast with the inner surface of the cylindrical body (e.g., white or other similar color). Therefore, an image segmentation algorithm (e.g., a color segmentation algorithm or other similar algorithm)

may be utilized to extract pixel coordinates (e.g., x-axis and y-axis pixel coordinates for each marker and protrusion in the one or more images captured by the camera) of different markers and protrusions. Then, through morphological computation, three-dimensional (3D) coordinates of each protrusion and marker can be obtained in a stage 306 and, at a stage 308, a displacement matrix of the markers and protrusions may be computed.

Figure 4:
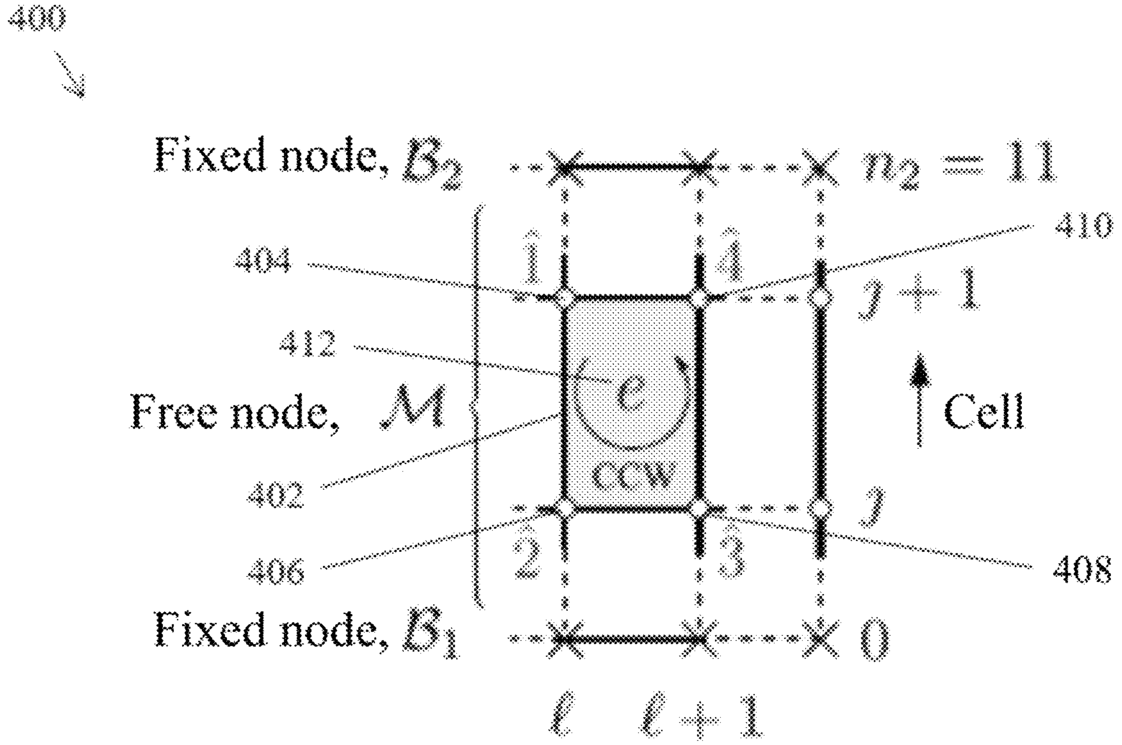
FIG. 4 shows an exemplary illustration of a cylindrical shell of the apparatus for applying finite element mesh analysis according to certain embodiments of the present disclosure.
Figure 5:
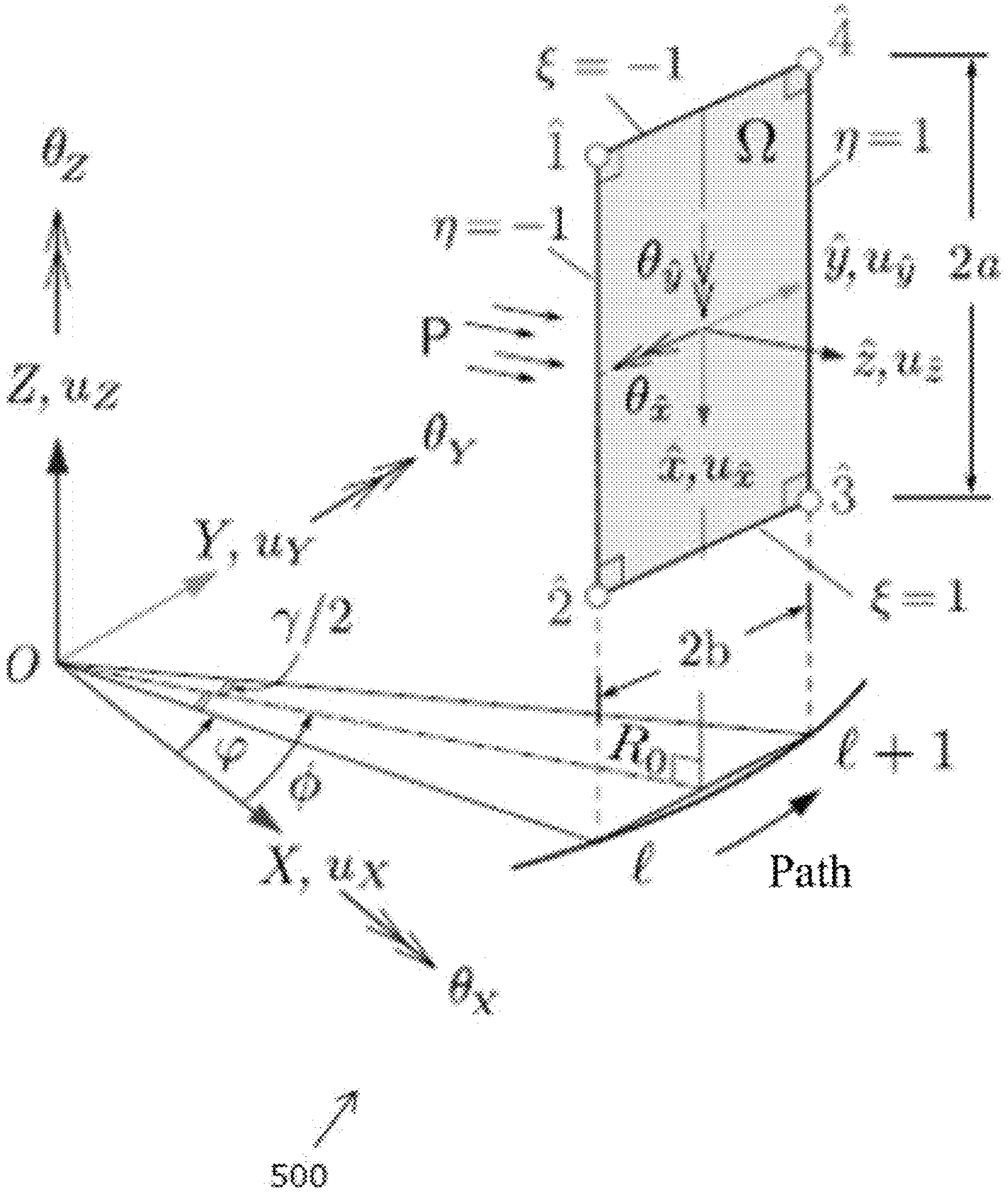
FIG. 5 shows an exemplary illustration of how finite element mesh may be applied to the apparatus for use in determining a force applied on a deformable material according to certain embodiments of the present disclosure.

With the displacement matrix as input, it is possible to reconstruct a force distribution map (e.g., as shown in stage 312) that can provide information of a force and a distribution of the force applied on the cylindrical body during stage 302. To do so, an artificial intelligence (AI)-based force reconstruction algorithm consisting of a physical model and a deep neural network may be used to process the displacement matrix, for example at stage 310 using a finite element model (FEM)-aided deep neural network (DNN). The physical model may comprise equations based on, for example, Reissner-Mindlin Flat Shell Theory or other similar theory, utilizing a kinetic model, a physical equation, a geometric equation, and a degree of freedom (DoF) of nodes equation as further described below. A FEM shell of the cylindrical body (comprising a plurality of nodes or cells that make up the curved surface of the cylindrical body) may be constructed by traversing the outer surface of the cylindrical body based on the DoF of nodes until each node or cell are covered, for example according to illustration 400 of FIG. 4 showing a node 402 in which traversal 412 around four corners 404, 406, 408 and 410 of the node 402 is in a counter clockwise direction, and according to illustration 500 of FIG. 5 in which each cell or node around the cylindrical body is traversed (e.g., traversal along a path in a counter clockwise direction around a center axis which represents the center of the cylindrical body). Each node or cell may represent a position of each dome (and thus each protrusion and marker) of the cylindrical body. An exemplary FEM of the cylindrical body is shown in illustration 600 of FIG. 6.

Figure 6:
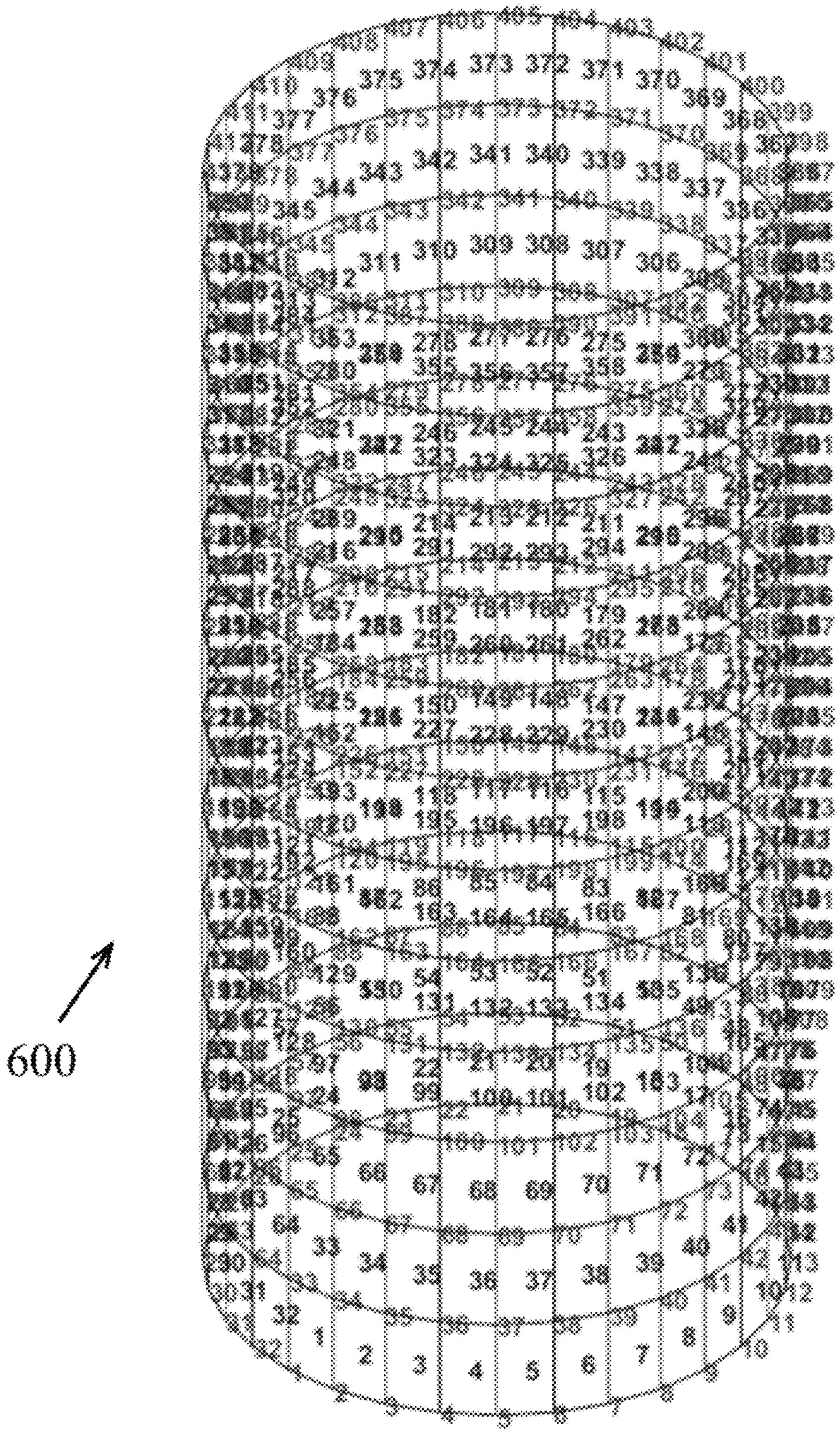
FIG. 6 shows a further exemplary illustration of how finite element mesh may be applied to the apparatus for use in determining a force applied on a deformable material according to certain embodiments of the present disclosure.

For example, in a physical model between a node displacement and a force magnitude, a shell (e.g., representing the curved surface of the cylindrical body, see also illustration 600 of FIG. 6) may be discretized to, for example, a four-node rectangular shell-based flat shell model. According to Reissner-Mindlin flat shell theory, the coordinates of a node O in the local coordinate system (see also illustration 400 of FIG. 4 and illustration 500 of FIG. 5) can be expressed as:

$$u'(x',y',z') = u'_0(x',y') - z'\theta_{0x'}(x',y')$$
$$v'(x',y',z') = v'_0(x',y') - z'\theta_{0y'}(x',y')$$
$$w'(x',y',z') = w'_0(x',y')$$

where $u'_0$, $v'_0$ and $w'_0$ are the displacements of node O along the local directions x', y' and z', respectively; Box, and Boy, are the rotation angles in the local planes x'z' and y'z', respectively; the local displacement vector of node O is $d'_0=[u'_0, v'_0, w'_0, \theta_{0x'}, \theta_{0y'}]^T$. Therefore, the displacement field within a rectangular element can be expressed by:

$$u = [u', v', w', \theta_{x'}, \theta_{y'}]^T = \sum_{i=1}^{4} N_i d'_i \tag{1}$$

where $N_i=\mathrm{diag}(N_i,N_i,N_i,N_i,N_i)$ represents a matrix of shape functions, $$N_i = \frac{1}{4}(1+\xi_i\xi)(1+\eta_i\eta),$$

with $\xi,\eta\in[-1\ 1]$, $$\xi = \frac{x'}{a},\ \eta = \frac{y'}{b},$$

$\xi=-1$, $\eta_{1,2}=-1$, $\xi_{2,3}=1$, $\eta_{3,4}=1$. The relevant strains $\hat{\varepsilon}$ and stresses $\sigma$ can be written as follows:

$$\hat{\varepsilon} = \begin{Bmatrix} \varepsilon'_m \\ \varepsilon'_b \\ \varepsilon'_s \end{Bmatrix} = \begin{Bmatrix} \frac{\partial u'}{\partial x'} \\ \frac{\partial v'}{\partial y'} \\ \frac{\partial u'}{\partial y'} + \frac{\partial v'}{\partial x'} \\ \frac{\partial \theta_{x'}}{\partial x'} \\ \frac{\partial \theta_{y'}}{\partial y'} \\ \frac{\partial \theta_{x'}}{\partial y'} + \frac{\partial \theta_{y'}}{\partial x'} \\ \frac{\partial w'}{\partial x'} - \theta_{x'} \\ \frac{\partial w'}{\partial y'} - \theta_{y'} \end{Bmatrix} = \sum_{i=1}^{4} \begin{Bmatrix} \frac{\partial N_i}{\partial x'}u'_i \\ \frac{\partial N_i}{\partial y'}v'_i \\ \frac{\partial N_i}{\partial y'}u'_i + \frac{\partial N_i}{\partial x'}v'_i \\ \frac{\partial N_i}{\partial x'}\theta_{x'_i} \\ \frac{\partial N_i}{\partial y'}\theta_{y'_i} \\ \frac{\partial N_i}{\partial y'}\theta_{x'_i} + \frac{\partial N_i}{\partial x'}\theta_{y'_i} \\ \frac{\partial N_i}{\partial x'}w'_i - N_i\theta_{x'_i} \\ \frac{\partial N_i}{\partial y'}w'_i - N_i\theta_{y'_i} \end{Bmatrix} = \sum_{i=1}^{4} \begin{Bmatrix} B'_{m_i} \\ B'_{b_i} \\ B'_{s_i} \end{Bmatrix} u'_i = \sum_{i=1}^{4} B'_i u'_i \tag{2}$$

$$\hat{\sigma} = \begin{Bmatrix} \sigma'_m \\ \sigma'_b \\ \sigma'_s \end{Bmatrix} = \begin{bmatrix} D_m & 0 & 0 \\ 0 & D_b & 0 \\ 0 & 0 & D_s \end{bmatrix} \begin{bmatrix} \varepsilon'_m \\ \varepsilon'_b \\ \varepsilon'_s \end{bmatrix} = D\hat{\varepsilon}$$

where $B'_{m_i}$, $B'_{b_i}$, and $B'_{s_i}$ are the membrane, bending and transvers shear strain matrices, respectively, given by:

$$B'_{m_i} = \begin{bmatrix} \frac{\partial N_i}{\partial x'} & 0 & 0 & 0 & 0 \\ 0 & \frac{\partial N_i}{\partial y'} & 0 & 0 & 0 \\ \frac{\partial N_i}{\partial y'} & \frac{\partial N_i}{\partial x'} & 0 & 0 & 0 \end{bmatrix},\ B'_{b_i} = \begin{bmatrix} 0 & 0 & 0 & \frac{\partial N_i}{\partial x'} & 0 \\ 0 & 0 & 0 & 0 & \frac{\partial N_i}{\partial y'} \\ 0 & 0 & 0 & \frac{\partial N_i}{\partial y'} & \frac{\partial N_i}{\partial x'} \end{bmatrix},$$

$$B'_{s_i} = \begin{bmatrix} 0 & 0 & \frac{\partial N_i}{\partial x'} & -N_i & 0 \\ 0 & 0 & \frac{\partial N_i}{\partial y'} & 0 & -N_i \end{bmatrix}$$

The constitutive matrices are given by:

$$D_m = \frac{Et}{1-v^2}\begin{bmatrix} 1 & v & 0 \\ v & 1 & 0 \\ 0 & 0 & \frac{1-v}{2} \end{bmatrix},\ D_b = \frac{t^2}{12}D_m,\ D_s = \frac{\kappa Et}{2(1+v)}\begin{bmatrix} 1 & 0 \\ 0 & 1 \end{bmatrix}$$

where E, v, and t are respectively the elastic modulus, Poisson's ratio, and shell thickness, κ is the shear correction factor and equals 5/6 for isotropic materials. By applying the principle of virtual work and the constitutive equation (3), we have:

$$\int\int_A \delta\hat{\varepsilon}^T D\hat{\varepsilon} dA - \int\int_A \delta u^T t dA = \delta u^T f \tag{4}$$

Substituting the equation (1) and (2) into equation (4), the equilibrium equations for element are given as $$k'_e \cdot u'_e = f'_e \tag{5}$$

where $f'_e$ represents the local force vector, combining the face load and node load, and the local stiffness matrix $k'_e$ can be obtained by:

$$\begin{aligned} k'_e &= \int\int_A B_i'^T D B'_j dA = ab\int_{-1}^{1}\int_{-1}^{1} B_i'^T D B'_j d\xi d\eta \\ &= ab\int_{-1}^{1}\int_{-1}^{1} \begin{bmatrix} B'_{m_i} \\ B'_{m_i} \\ B'_{m_i} \end{bmatrix}^T \begin{bmatrix} D_m & 0 & 0 \\ 0 & D_b & 0 \\ 0 & 0 & D_s \end{bmatrix} \begin{bmatrix} B'_{m_i} \\ B'_{m_i} \\ B'_{m_i} \end{bmatrix} d\xi d\eta \\ &= k'_m + k'_b + k'_s \end{aligned}$$

where:

$$k'_m = ab\int_{-1}^{1}\int_{-1}^{1} B_{m_i}'^T D_m B'_{m_j} d\xi d\eta$$

$$k'_b = ab\int_{-1}^{1}\int_{-1}^{1} B_{b_i}'^T D_b B'_{b_j} d\xi d\eta$$

$$k'_s = ab\int_{-1}^{1}\int_{-1}^{1} B_{s_i}'^T D_s B'_{s_j} d\xi d\eta$$

Then, a global system (e.g., representing, for example, the cylindrical shell or body of the apparatus) can be described as:

$$u_e = L_i(\phi) \cdot u'_e$$

$$f_e = L_i(\phi) \cdot f'_e$$

$$k_e = L_i(\phi) \cdot k'_e \cdot L_i^T(\phi)$$

where transformation matrices $L_i(\phi)$ (e.g., displacement matrices) is formulated as:

$$L_i(\phi) = \begin{bmatrix} 0 & -\sin\phi & \cos\phi & 0 & 0 \\ 0 & \cos\phi & \sin\phi & 0 & 0 \\ -1 & 0 & 0 & 0 & 0 \\ 0 & 0 & 0 & \sin\phi & 0 \\ 0 & 0 & 0 & -\cos\phi & 0 \\ 0 & 0 & 0 & 0 & -1 \end{bmatrix}$$

wherein the angle ϕ of an element is the angle between the global x axis and normal vector of this element. It will be appreciated that other variations of the above equations are possible for obtaining the displacement matrices.

Thus, after the displacement matrix is obtained, an initial force distribution $F_p$ may be computed through the physical model based on for example an equation $F_p=K\cdot U$ (e.g., see equation 5 as shown above), in which K is the stiffness matrix in the physical model, and the U is the obtained displacement matrix. It will be appreciated that other similar physical models and equations may also be utilized for the FEM-aided DNN. In the FEM-aided DNN at stage 310, model errors e that may be present in the physical model are compensated by a DNN (e.g., ResNet, or other similar DNN) according to an equation e=g(U), where g( ) represents the DNN and U is the obtained displacement matrix. Therefore, a final force distribution map can be computed by the following equation: $F=F_p+e=K\cdot U+g(U)$. The above computation process may be completed within for example 0.1s to dynamically show the distributed force map.

Figure 7:
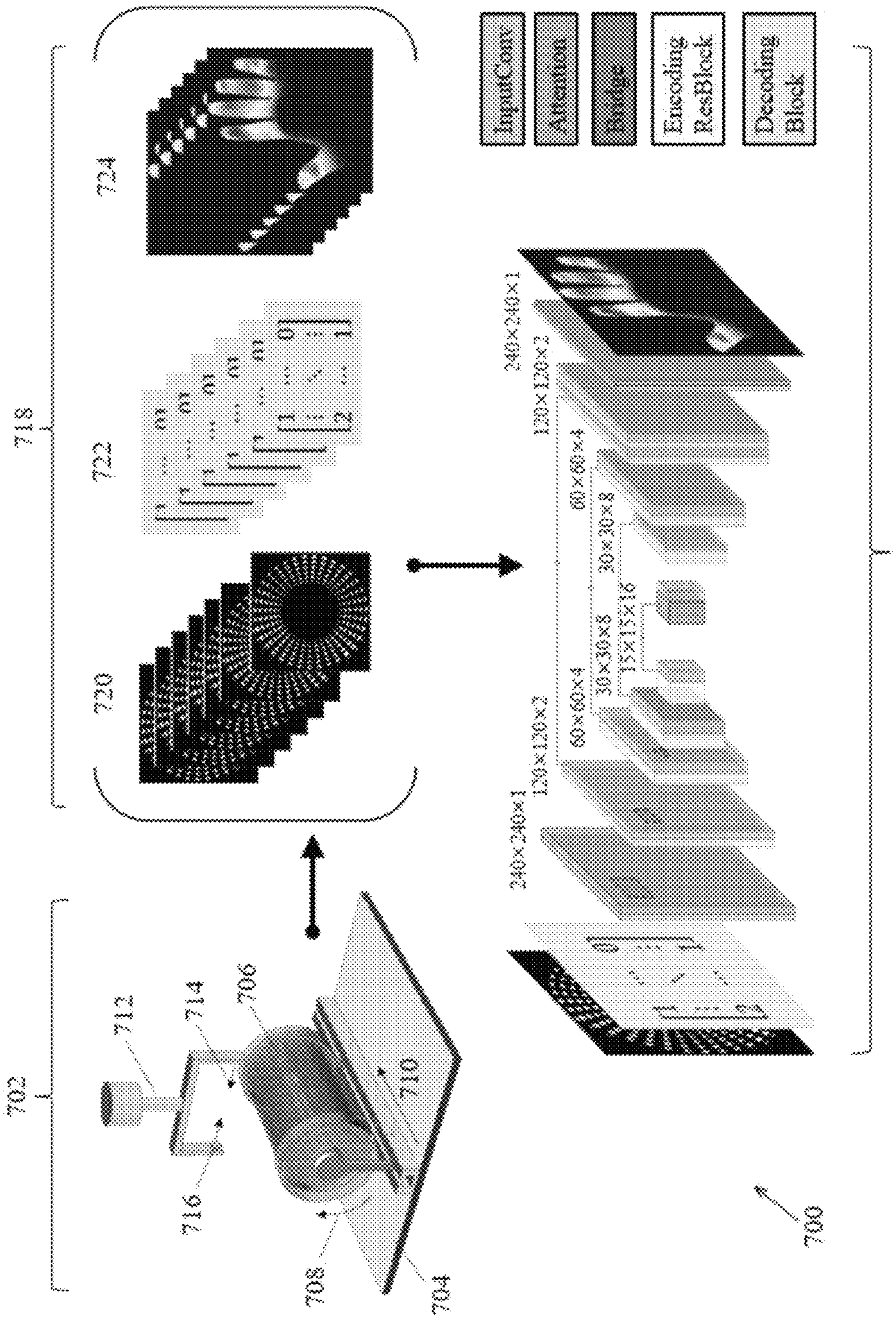
FIG. 7 shows an exemplary illustration of how training data may be obtained for use in determining a force applied on a deformable material according to certain embodiments of the present disclosure.

The DNN may be trained by a plurality of displacement matrices (obtained from a plurality of training iterations) and ground truth data of force distribution as shown in FIG. 7. For example, in order to collect training data for the DNN, a position and angle controllable three-DoF test bench 704 may be utilized at a first stage 702 to apply a force at each point of a cylindrical body 706 (e.g., each node or cell of the cylindrical body 706). The three-DoF may comprise an angular degree of freedom around the cylindrical body 706 (e.g., via a rotation 708 of the cylindrical body 706), a plane position degree of freedom (e.g., via a translation 710 along the plane of the test bench 704) and a clamping distance degree of freedom (e.g., via an up or down movement of clamping device 712), and these DoFs are input to the DoF of node equation. The test bench 704 may be equipped with a standard force sensor 716 configured to simultaneously record an actual force distribution map for use as ground truth data as a force 714 is applied on the cylindrical body 706. At a next stage 718, a corresponding plurality of images 720 captured from a visual sensor such as a camera (e.g., disposed at an end of the cylindrical body 706, for example at the first end 102 of the cylindrical body 128), a corresponding plurality of marker displacement matrices 722 generated based on the plurality of images 720, as well as corresponding ground truth data 724 obtained from the force sensor 716 are collected to build a large amount of training data. At a further stage 726, the DNN is trained based on the data obtained in stage 718. The whole process of collecting data and training the DNN may be automatic and completed in several hours (depending on the central processing unit (CPU) being used). Based on the trained DNN, it is thus possible to, in response to a force residual map (e.g., a map comprising a difference between observed and predicted values of forces applied on the cylindrical body) applied on the cylindrical body 128 of the apparatus 100, determine a distribution of the residual force, and accordingly show the result via a distributed force map by combining the force map of the physical model with the force residual map. Advantageously, the DNN predicts errors between the above physical model and ground truth data to provide an improved system for determining a force and a distribution of the force applied on the cylindrical body. In this section, the function of DNN is to predict the error between the above physical model and ground truth data.

When a hand is used to grip the cylindrical body, a majority of force is typically distributed on fingertips and *musculus* flexor pollicis *brevis*, which is in line with the force characteristics of grip strength and shows that the results (e.g., obtained as shown in distributed force map 312 of FIG. 3) are accurate. The obtained distributed force is thus accurate with high resolution because the AI-based force reconstruction algorithm is accurate with at least a second-order continuity on the curved surface of the cylindrical body. Meanwhile, the optical tracking of markers is with high robustness. Therefore, it is advantageously possible to simultaneously achieve high resolution and high robustness for distributed force reconstruction.

Figure 8:
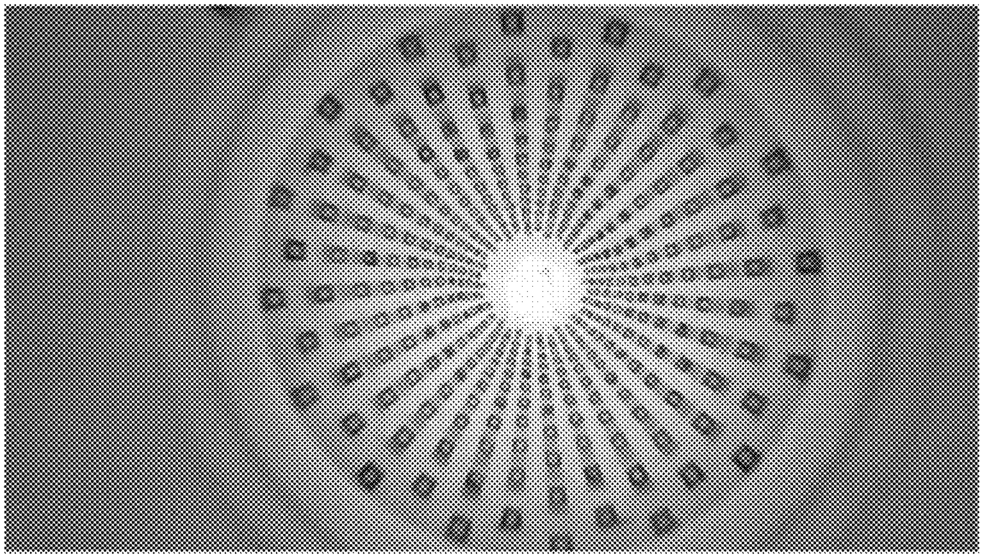
FIG. 8 shows an exemplary captured image from the apparatus for use in determining a force applied on a deformable material according to certain embodiments of the present disclosure.
Figure 9:
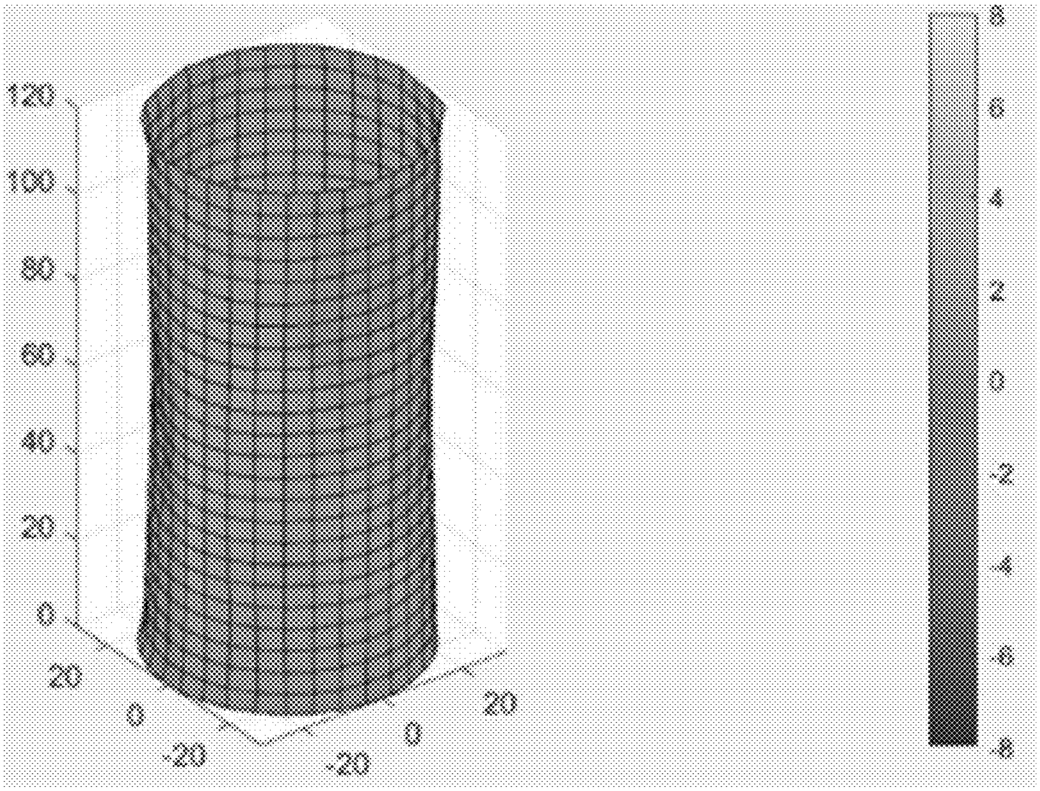
FIG. 9 shows an exemplary three-dimensional (3D) reconstruction of a cylindrical shell of the apparatus according to certain embodiments of the present disclosure.
Figure 10:
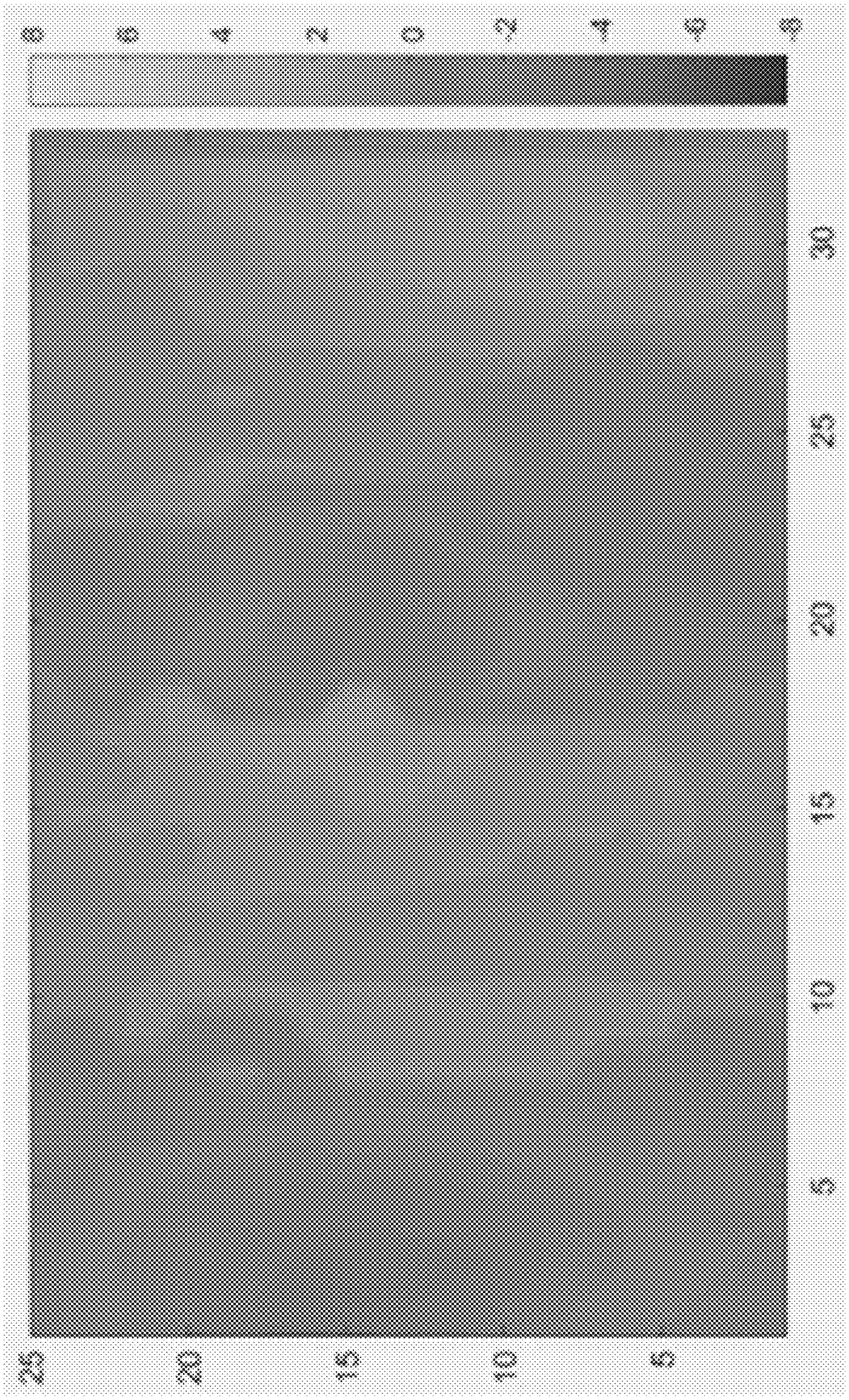
FIG. 10 shows an exemplary illustration of an unwrapped deformation matrix obtained from finite mesh analysis of the cylindrical shell according to certain embodiments of the present disclosure.
Figure 11:
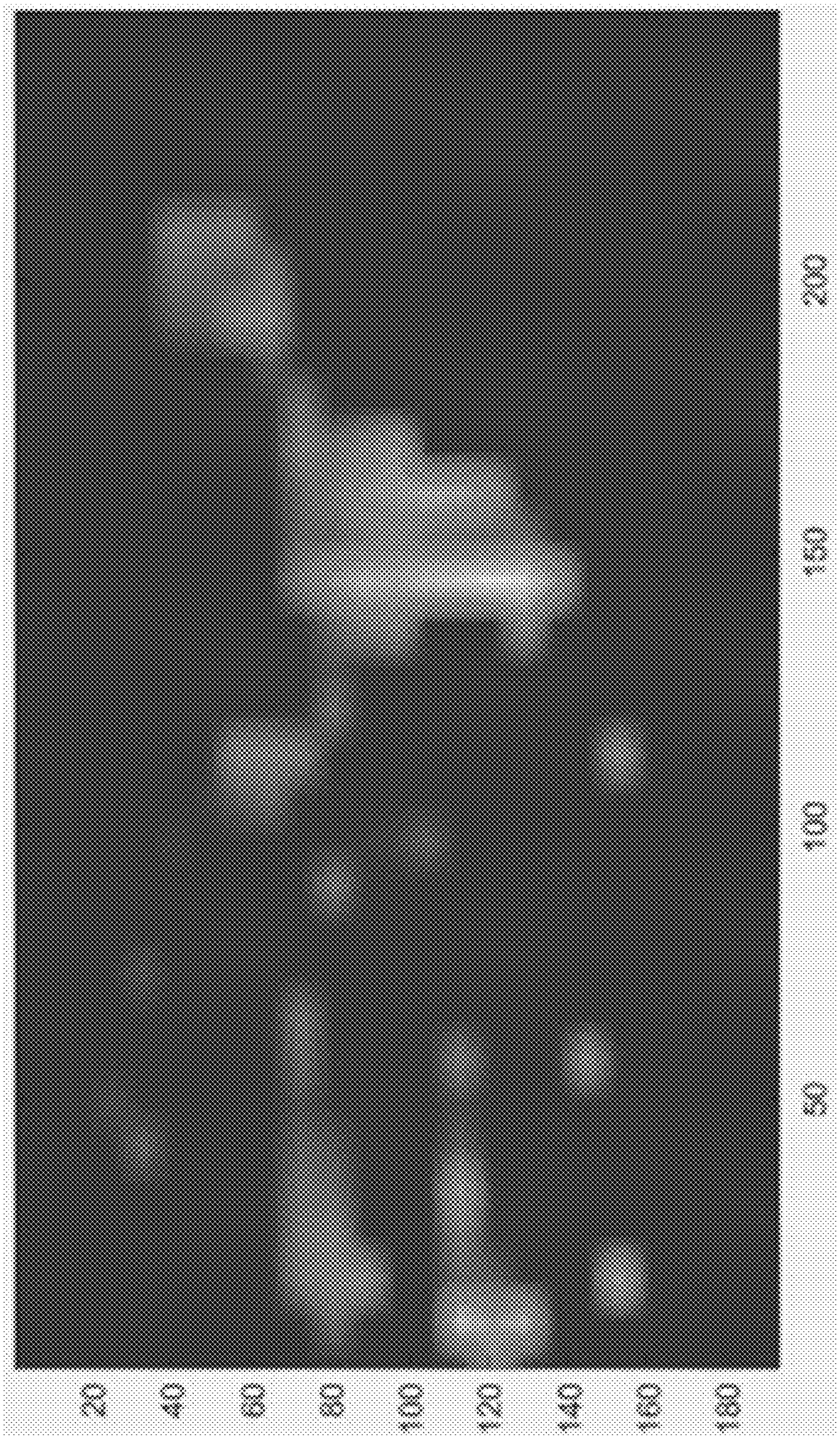
FIG. 11 shows an exemplary illustration of a force map reconstruction of the cylindrical shell according to certain embodiments of the present disclosure.

In a further example of application of the apparatus 100, an image 800 of FIG. 8 may be captured by the visual sensor 122 showing a displacement of the plurality of markers 118 and protrusions 110 as a result of a force applied on the cylindrical body 128. A 3D reconstruction of the cylindrical body 128 (e.g., deformed by the force applied on the cylindrical body 128) may be generated based on the captured image as shown in illustration 900 of FIG. 9. The 3D reconstruction may be processed to form an unwrapped deformation matrix as shown in illustration 1000 of FIG. 10. The deformation matrix may then be analysed based on historical data (e.g., training data obtained from the training setup 700 of FIG. 7) to obtain a force map reconstruction as shown in illustration 1100 of FIG. 11.

Figure 12:
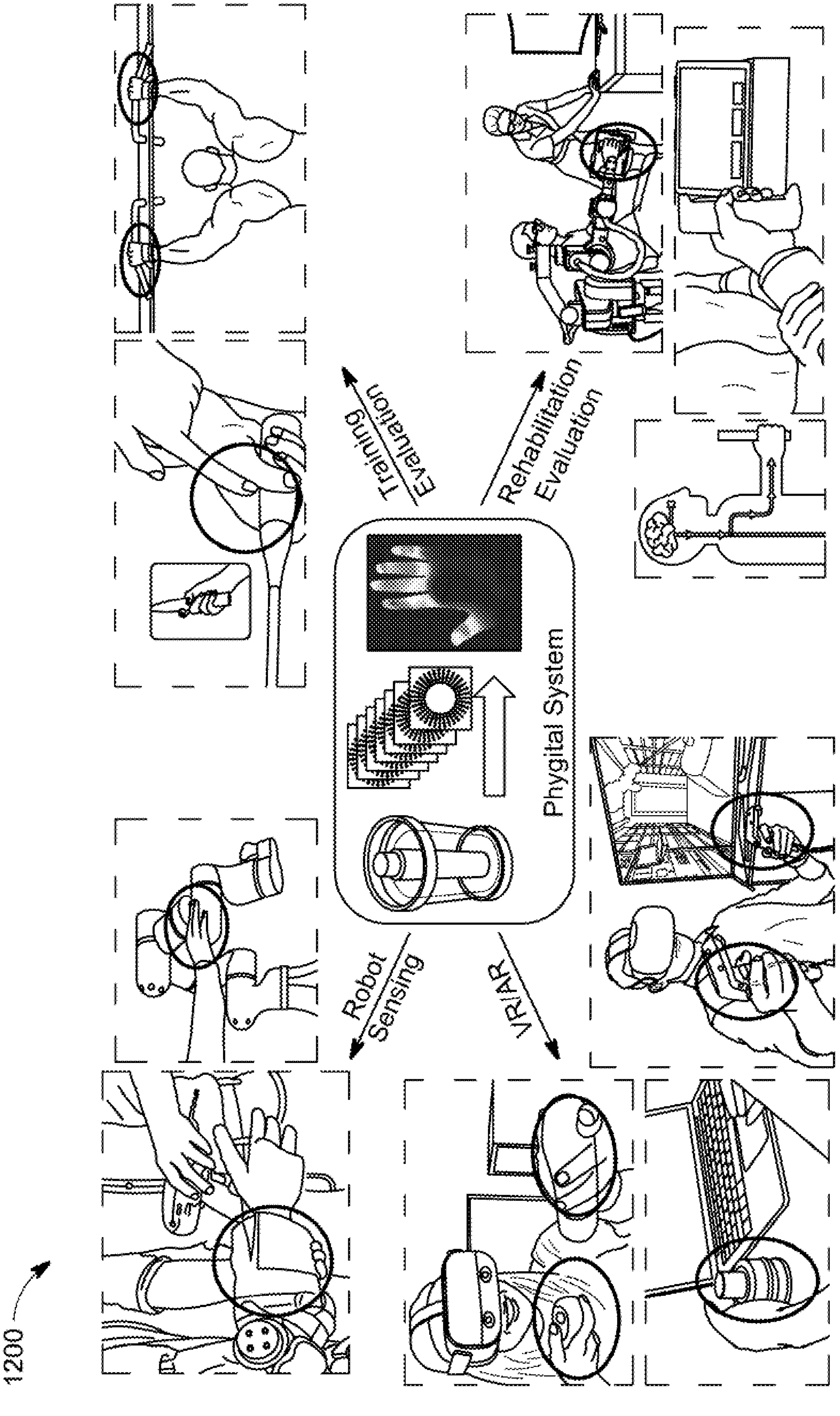
FIG. 12 shows an exemplary illustration of how the apparatus and system for determining a force applied on a deformable material may be utilized according to certain embodiments of the present disclosure.

FIG. 12 shows an exemplary illustration 1200 of how the apparatus and system for determining a force applied on a deformable material may be utilized according to various embodiments of the present disclosure. For example, the apparatus and system may have applications in interaction with virtual reality and augmented reality (e.g., via use of the apparatus as a controller), medical evaluation and rehabilitation for example for injured hands, scientific training evaluation (e.g., for sports, exercise, bodybuilding, and other similar applications) as well as robotic sensing (e.g., via use of the apparatus as part of a robot/machine or as a controller for interaction with a robot/machine, or other similar applications).

Figure 13:
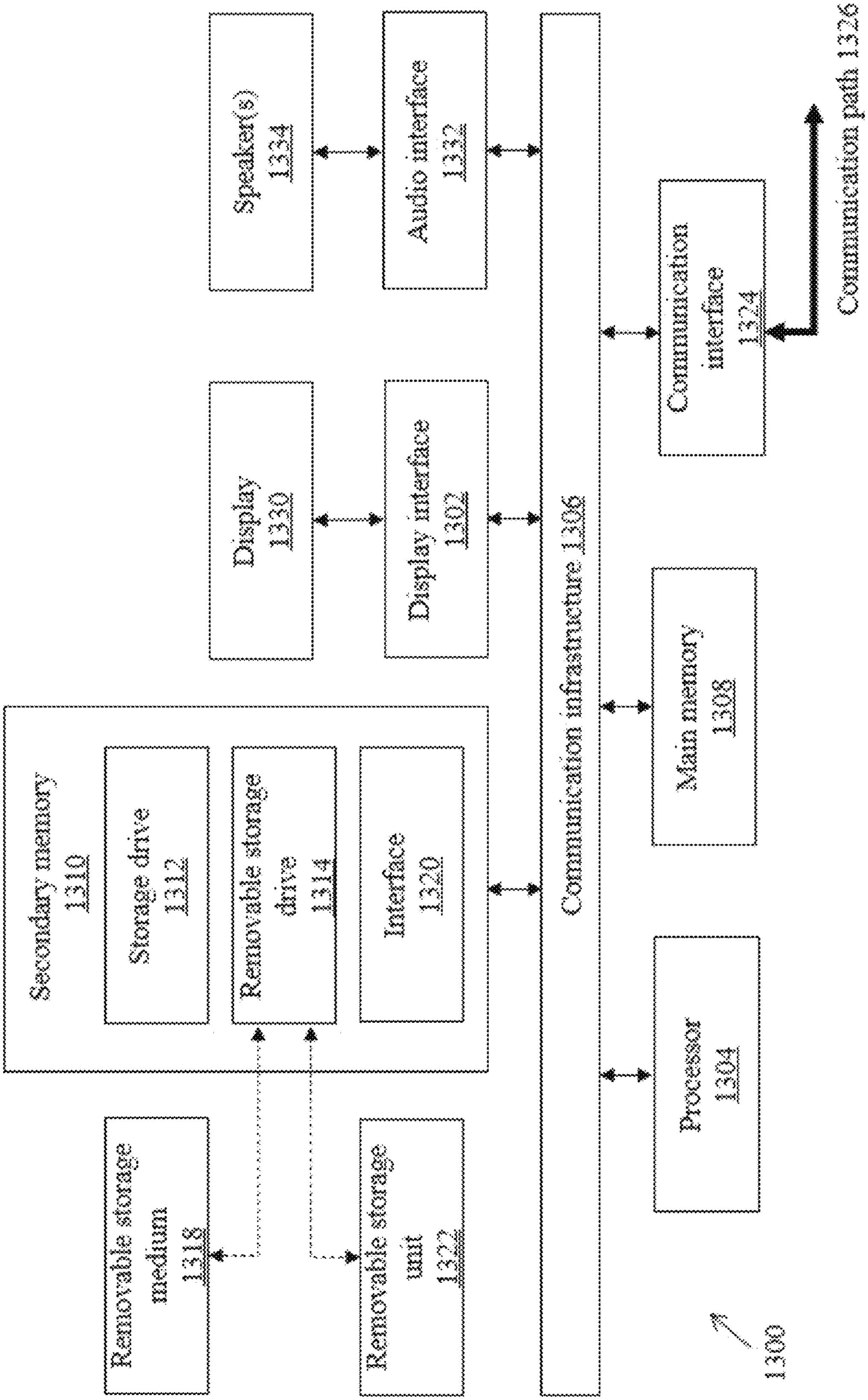
FIG. 13 shows a schematic diagram of an exemplary computing device suitable for use in determining a force applied on a deformable material according to certain embodiments of the present disclosure.

FIG. 13 shows a schematic diagram of an exemplary computing device suitable for use in determining a force applied on a deformable material.

FIG. 13 depicts an exemplary computing device 1300, hereinafter interchangeably referred to as a computer system 1300, where one or more such computing devices 1300 may be used as a system for determining a force applied on a deformable material and execute the processes and calculations as depicted in at least FIGS. 3 to 11. The following description of the computing device 1300 is provided by way of example only and is not intended to be limiting.

As shown in FIG. 13, the example computing device 1300 includes a processor 1304 for executing software routines. Although a single processor is shown for the sake of clarity, the computing device 1300 may also include a multi-processor system. The processor 1304 is connected to a communication infrastructure 1306 for communication with other components of the computing device 1300. The communication infrastructure 1306 may include, for example, a communications bus, cross-bar, or network.

The computing device 1300 further includes a main memory 1308, such as a random access memory (RAM), and a secondary memory 1310. The secondary memory 1310 may include, for example, a storage drive 1312, which may be a hard disk drive, a solid state drive or a hybrid drive and/or a removable storage drive 1314, which may include a magnetic tape drive, an optical disk drive, a solid state storage drive (such as a USB flash drive, a flash memory device, a solid state drive or a memory card), or the like. The removable storage drive 1314 reads from and/or writes to a removable storage medium 1318 in a well-known manner. The removable storage medium 1318 may include magnetic tape, optical disk, non-volatile memory storage medium, or the like, which is read by and written to by removable storage drive 1314. As will be appreciated by persons skilled in the relevant art(s), the removable storage medium 1318 includes a computer readable storage medium having stored therein computer executable program code instructions and/or data.

In an alternative implementation, the secondary memory 1310 may additionally or alternatively include other similar means for allowing computer programs or other instructions to be loaded into the computing device 1300. Such means can include, for example, a removable storage unit 1322 and an interface 1320. Examples of a removable storage unit 1322 and interface 1320 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1322 and interfaces 1320 which allow software and data to be transferred from the removable storage unit 1322 to the computer system 1300.

The computing device 1300 also includes at least one communication interface 1324. The communication interface 1324 allows software and data to be transferred between computing device 1300 and external devices via a communication path 1326. In various embodiments of the disclosures, the communication interface 1324 permits data to be transferred between the computing device 1300 and a data communication network, such as a public data or private data communication network. The communication interface 1324 may be used to exchange data between different computing devices 1300 which such computing devices 1300 form part an interconnected computer network. Examples of a communication interface 1324 can include a modem, a network interface (such as an Ethernet card), a communication port (such as a serial, parallel, printer, GPIB, IEEE 1394, RJ45, USB), an antenna with associated circuitry and the like. The communication interface 1324 may be wired or may be wireless. Software and data transferred via the communication interface 1324 are in the form of signals which can be electronic, electromagnetic, optical or other signals capable of being received by communication interface 1324. These signals are provided to the communication interface via the communication path 1326.

As shown in FIG. 13, the computing device 1300 further includes a display interface 1302 which performs operations for rendering images or videos to an associated display 1330 and an audio interface 1332 for performing operations for playing audio content via associated speaker(s) 1334.

As used herein, the term "computer program product" may refer, in part, to removable storage medium 1318, removable storage unit 1322, a hard disk installed in storage drive 1312, or a carrier wave carrying software over communication path 1326 (wireless link or cable) to communication interface 1324. Computer readable storage media refers to any non-transitory, non-volatile tangible storage medium that provides recorded instructions and/or data to the computing device 1300 for execution and/or processing. Examples of such storage media include magnetic tape, CD-ROM, DVD, Blu-ray Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1300. Examples of transitory or non-tangible computer readable transmission media that may also participate in the provision of software, application programs, instructions and/or data to the computing device 1300 include radio or infrared transmission channels as well as a network connection to another computer or networked device, and the Internet or Intranets including e-mail transmissions and information recorded on Websites and the like.

The computer programs (also called computer program code) are stored in main memory 1308 and/or secondary memory 1310. Computer programs can also be received via the communication interface 1324. Such computer programs, when executed, enable the computing device 1300 to perform one or more features of embodiments discussed herein. In various embodiments, the computer programs, when executed, enable the processor 1304 to perform features of the above-described embodiments. Accordingly, such computer programs represent controllers of the computer system 1300.

Software may be stored in a computer program product and loaded into the computing device 1300 using the removable storage drive 1314, the storage drive 1312, or the interface 1320. The computer program product may be a non-transitory computer readable medium. Alternatively, the computer program product may be downloaded to the computer system 1300 over the communications path 1326. The software, when executed by the processor 1304, causes the computing device 1300 to perform, as a system for determining a force applied on a deformable material, the necessary operations to execute the processes, perform the calculations, generate the 3D reconstruction(s) and force map reconstruction(s), and other similar computations as shown in FIGS. 3-11. In an implementation, the system for determining a force applied on a deformable material may comprise the apparatus 100, a visual sensor situated at the first end 102 of the cylindrical body 128 for monitoring a displacement of the plurality of protrusions 110 in response to the deformation of the cylindrical body 128. The system may be configured to determine a length of the displacement of each of the plurality of protrusions 110 and/or markers 118 captured by the visual sensor; and determine a force applied on the apparatus 100 based on a comparison of the length of the displacement with historical data. The system may be further configured to calculate a distribution of the force applied on the apparatus 100 based on the force determined for each of the plurality of protrusions 110 and/or markers 118.

It is to be understood that the embodiment of FIG. 13 is presented merely by way of example to explain the operation and structure of a system for determining a force applied on a deformable material. Therefore, in some embodiments one or more features of the computing device 1300 may be omitted. Also, in some embodiments, one or more features of the computing device 1300 may be combined together. Additionally, in some embodiments, one or more features of the computing device 1300 may be split into one or more component parts.

It will be appreciated by a person skilled in the art that numerous variations and/or modifications may be made to the present disclosure as shown in the specific embodiments without departing from the scope of the disclosure as broadly described. The present embodiments are, therefore, to be considered in all respects to be illustrative and not restrictive.

The invention claimed is:

1. An apparatus comprising:

a body made of a deformable material; and a plurality of protrusions movably attached to an inner surface of the body, each of the plurality of protrusions extending in a direction from the inner surface towards a center of the body, and configured to be moveable in the direction in response to a deformation of the body, wherein a length of each of the plurality of protrusions is proportional to a distance of each of the plurality of protrusions from a first end of the body.

2. The apparatus of claim 1, further comprising:

a plurality of holes disposed at an outer surface of the body, each of the plurality of holes extending through each of the plurality of protrusions;

a plurality of domes on the outer surface of the body, each of the plurality of domes covering each of the plurality of holes; and a plurality of markers attached at one end to the plurality of domes, each of the plurality of markers extending from each of the plurality of domes into each of the plurality of holes, wherein each of the plurality of markers are configured to be moveable along each of the plurality of holes in response to a deformation of each of the plurality of domes.

3. The apparatus of claim 2, further comprising a color at another end of each of the plurality of markers that is different from both a color at an end of each of the plurality of protrusions and a color of the inner surface of the body to facilitate monitoring of a displacement of the plurality of markers and the plurality of protrusions.

4. The apparatus of claim 2, where the plurality of domes are made of the deformable material.

5. The apparatus of claim 1, further comprising a visual sensor situated at the first end of the body for monitoring a displacement of the plurality of protrusions in response to the deformation of the body.

6. The apparatus of claim 5, further comprising a pillar-shaped light source extending through the center of the body from a second end opposite to the first end of the body.

7. The apparatus of claim 6, wherein the pillar-shaped light source further comprises a polarized film covering a surface of the pillar-shaped light source.

8. The apparatus of claim 1, wherein the deformable material is an artificial skin.

9. A system for monitoring a force applied on a deformable material, the system comprising:

the apparatus of claim 1;

a visual sensor situated at the first end of the body for monitoring a displacement of the plurality of protrusions in response to the deformation of the body;

at least one processor; and at least one memory including computer program code; the at least one memory and the computer program code configured to, with the at least one processor, cause the system at least to:

determine a length of the displacement of each of the plurality of protrusions captured by the visual sensor; and determine the force applied on the apparatus based on a comparison of the length of the displacement with historical data.

10. The system of claim 9, further configured to calculate a distribution of the force applied on the apparatus based on the force determined for each of the plurality of protrusions.

11. The system of claim 9, further comprising a color at an end of each of the plurality of protrusions that is different from a color of the inner surface of the body to facilitate monitoring of the displacement of the plurality of protrusions.

12. The system of claim 9, further comprising:

a plurality of holes disposed at an outer surface of the body, each of the plurality of holes extending through each of the plurality of protrusions;

a plurality of domes on the outer surface of the body, each of the plurality of domes covering each of the plurality of holes; and a plurality of markers attached at one end to the plurality of domes, each of the plurality of markers extending from each of the plurality of domes into each of the plurality of holes, wherein each of the plurality of markers are configured to be moveable along each of the plurality of holes in response to a deformation of each of the plurality of domes.

13. The system of claim 12, further comprising a color at another end of each of the plurality of markers that is different from both a color at an end of each of the plurality of protrusions and a color of the inner surface of the body, wherein the visual sensor is configured to monitor a displacement of the plurality of markers and the plurality of protrusions based on a displacement of the respective colors.

14. The system of claim 12, further configured to:

determine a length of the displacement of each of the plurality of markers captured by the visual sensor; and determine a force applied on the apparatus based on a comparison of the length of the displacement with historical data.

15. The system of claim 14, further configured to calculate a distribution of the force applied on the apparatus based on the force determined for each of the plurality of markers.

16. The system of claim 9, further comprising a pillar-shaped light source extending through the center of the body from a second end opposite to the first end of the body.

17. The system of claim 16, wherein the pillar-shaped light source further comprises a polarized film covering a surface of the pillar-shaped light source.

18. An apparatus comprising:

a body made of a deformable material;

a plurality of protrusions movably attached to an inner surface of the body, each of the plurality of protrusions extending in a direction from the inner surface towards a center of the body, and configured to be moveable in the direction in response to a deformation of the body, wherein each of the plurality of protrusions has a color at an end that is different from a color of the inner surface of the body to facilitate monitoring of a displacement of the plurality of protrusions.

* * * * *